US010850644B2

(12) United States Patent
Condamin et al.

(10) Patent No.: US 10,850,644 B2
(45) Date of Patent: Dec. 1, 2020

(54) SUPPORT ASSEMBLY WITH CAM ASSEMBLY

(71) Applicant: Lear Corporation, Southfield, MI (US)

(72) Inventors: Thibaud Condamin, Orliénas (FR); Nordine Hamtache, Roche la Moliere (FR); Antoine Moulin, Aurec-sur-Loire (FR)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 16/131,404

(22) Filed: Sep. 14, 2018

(65) Prior Publication Data

US 2019/0337422 A1 Nov. 7, 2019

(30) Foreign Application Priority Data

May 4, 2018 (FR) ..................... 18 53891
May 4, 2018 (FR) ..................... 18 53892
(Continued)

(51) Int. Cl.
*B60N 2/00* (2006.01)
*B60N 2/07* (2006.01)
(Continued)

(52) U.S. Cl.
CPC ......... *B60N 2/0732* (2013.01); *B60N 2/0715* (2013.01); *B60N 2/0722* (2013.01);
(Continued)

(58) Field of Classification Search
CPC ........................... B60N 2/0705; B60N 2/0806
(Continued)

(56) References Cited

U.S. PATENT DOCUMENTS 2,126,143 A 8/1938 McGregor
2,263,554 A 11/1941 Brach
(Continued)

FOREIGN PATENT DOCUMENTS

CN 203190203 U 3/2013
CN 203799201 U 8/2014
(Continued)

OTHER PUBLICATIONS

Co-pending, Condamin, et al., U.S. Appl. No. 16/131,360, filed Sep. 14, 2018.
(Continued)

*Primary Examiner* — Steven M Marsh
(74) *Attorney, Agent, or Firm* — Fishman Stewart PLLC

(57) ABSTRACT

A cam assembly includes a pin, a first cam, a second cam, and/or a bearing. The first cam may be connected to the pin, and/or the second cam may be connected to the pin. A bearing may be configured to rotatable support the pin. The second cam may include a first portion and/or a second portion. The first portion of the second cam may be configured to contact a track in a first vertical position of the pin. The second portion of the second cam may be configured to contact said track in a second vertical position of the pin. The first portion may be vertically offset from the second portion. The first position of the pin may correspond to an unloaded state. The second vertical position of the pin may correspond to a loaded state.

20 Claims, 10 Drawing Sheets

(30) Foreign Application Priority Data

May 4, 2018 (FR) .................................... 18 53893
May 4, 2018 (FR) .................................... 18 53894

(51) Int. Cl.
| | | |
|---|---|---|
| *B60N 2/54* | (2006.01) | |
| *B60N 2/50* | (2006.01) | |
| *B60N 2/08* | (2006.01) | |
| *B60N 2/20* | (2006.01) | |
| *B60R 22/22* | (2006.01) | |
| *B60N 2/90* | (2018.01) | |

(52) U.S. Cl.
CPC ......... *B60N 2/0806* (2013.01); *B60N 2/0818* (2013.01); *B60N 2/0843* (2013.01); *B60N 2/20* (2013.01); *B60N 2/502* (2013.01); *B60N 2/54* (2013.01); *B60N 2/933* (2018.02); *B60R 22/22* (2013.01)

(58) Field of Classification Search
USPC .................................................. 248/424, 429
See application file for complete search history.

(56) References Cited

U.S. PATENT DOCUMENTS

| | | |
|---|---|---|
| 2,480,622 A | 8/1949 | Warnock |
| 2,678,082 A | 5/1954 | Walker |
| 3,181,102 A | 4/1965 | Fehr, Jr. |
| 3,213,403 A | 10/1965 | Hermann et al. |
| 3,268,848 A | 8/1966 | Adams et al. |
| 3,940,182 A | 2/1976 | Tamura |
| 4,020,769 A | 5/1977 | Keir |
| 4,198,025 A | 4/1980 | Lowe et al. |
| 4,243,248 A | 1/1981 | Scholz et al. |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,776,809 A | 10/1988 | Hall |
| 4,830,531 A | 5/1989 | Condit et al. |
| 4,961,559 A | 10/1990 | Raymor |
| 4,969,621 A | 11/1990 | Munchow et al. |
| 4,987,316 A | 1/1991 | White et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,322,982 A | 6/1994 | Leger et al. |
| 5,332,290 A | 7/1994 | Borlinghaus et al. |
| 5,348,373 A | 9/1994 | Stiennon |
| 5,446,442 A | 8/1995 | Swart et al. |
| 5,466,892 A | 11/1995 | Howard et al. |
| 5,489,173 A | 2/1996 | Hofle |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,796,177 A | 8/1998 | Werbelow et al. |
| 5,800,015 A | 9/1998 | Tsuchiya et al. |
| 5,899,532 A | 5/1999 | Paisley et al. |
| 5,918,847 A | 7/1999 | Couasnon |
| 5,921,606 A | 7/1999 | Moradell et al. |
| 5,964,442 A | 10/1999 | Wingblad et al. |
| 5,964,815 A | 10/1999 | Wallace et al. |
| 6,036,157 A | 3/2000 | Baroin et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,299,230 B1 | 10/2001 | Oettl |
| 6,318,802 B1 | 11/2001 | Sjostrom et al. |
| 6,357,814 B1 | 3/2002 | Boisset et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,113,541 B1 | 9/2006 | Lys et al. |
| 7,159,899 B2 | 1/2007 | Nitschke et al. |
| 7,170,192 B2 | 1/2007 | Kazmierczak |
| 7,207,541 B2 * | 4/2007 | Frohnhaus ........... B60N 2/0705 248/424 |
| 7,271,501 B2 | 9/2007 | Dukart et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,388,466 B2 | 6/2008 | Ghabra et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 * | 7/2011 | Kostin ................. B60N 2/0881 248/429 |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,422,058 B2 | 8/2016 | Fischer et al. |
| 9,561,770 B2 | 2/2017 | Sievers et al. |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |

(56) References Cited

U.S. PATENT DOCUMENTS

| | | |
|---|---|---|
| 9,758,061 B2 * | 9/2017 | Pluta .................. B60N 2/06 |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,919,624 B2 | 3/2018 | Cziomer et al. |
| 9,950,682 B1 | 4/2018 | Gramenos et al. |
| 10,059,232 B2 | 8/2018 | Frye et al. |
| 10,160,351 B2 | 12/2018 | Sugimoto et al. |
| 10,479,227 B2 | 11/2019 | Nolte et al. |
| 10,493,243 B1 | 12/2019 | Braham |
| 10,549,659 B2 | 2/2020 | Sullivan et al. |
| 10,654,378 B2 | 5/2020 | Pons |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2014/0263920 A1 * | 9/2014 | Anticuar .............. B60N 2/0705 248/429 |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2016/0039314 A1 * | 2/2016 | Anticuar .............. B60N 2/0806 248/429 |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0086232 A1 | 3/2018 | Kume |
| 2018/0105072 A1 | 4/2018 | Pons |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0269754 A1 | 8/2020 | Ricart et al. |

FOREIGN PATENT DOCUMENTS

| | | |
|---|---|---|
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 A2 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 04098943 A1 | 11/2004 |
| WO | 2005/068247 A2 | 7/2005 |

OTHER PUBLICATIONS

Co-pending, Condamin, et al., U.S. Appl. No. 16/131,384, filed Sep. 14, 2018.
Co-pending, Condamin, et al., U.S. Appl. No. 16/131,415, filed Sep. 14, 2018.
Co-pending, Condamin, et al., U.S. Appl. No. 16/131,614, filed Sep. 14, 2018.
Co-pending U.S. Appl. No. 16/294,289, filed Mar. 6, 2019.
Co-pending U.S. Appl. No. 16/296,379, filed Mar. 8, 2019.
Co-pending U.S. Appl. No. 16/597,187, filed Oct. 9, 2019.
Co-pending U.S. Appl. No. 16/672,989, filed Nov. 4, 2019.
Co-pending U.S. Appl. No. 16/784,576, filed Feb. 7, 2020.
Co-pending U.S. Appl. No. 16/711,661, filed Dec. 12, 2019.

* cited by examiner

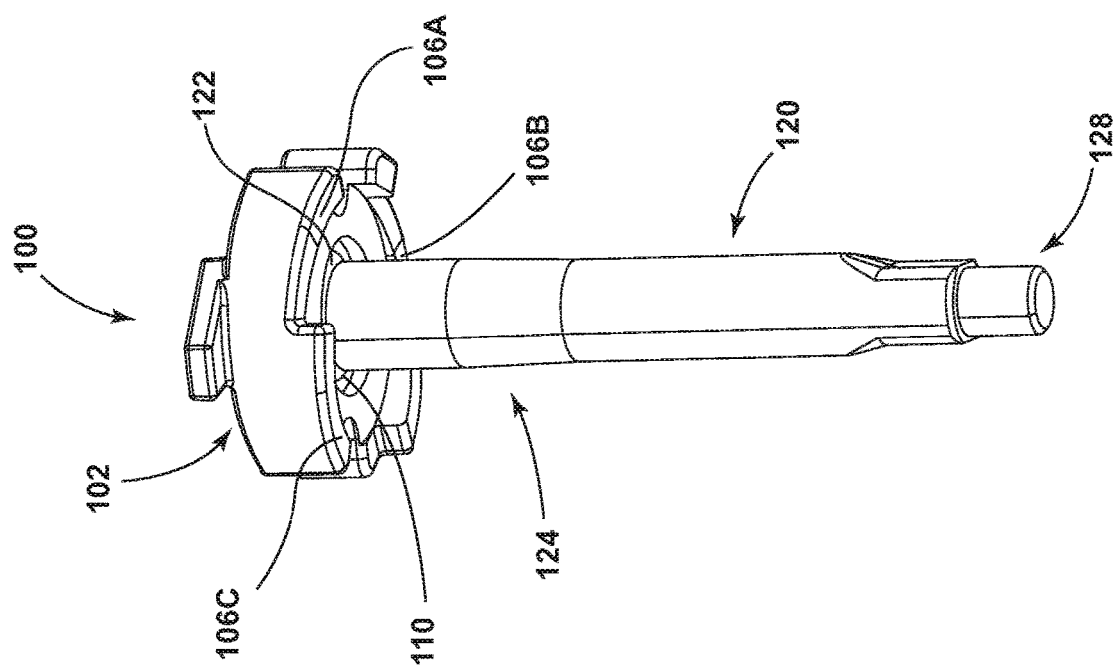
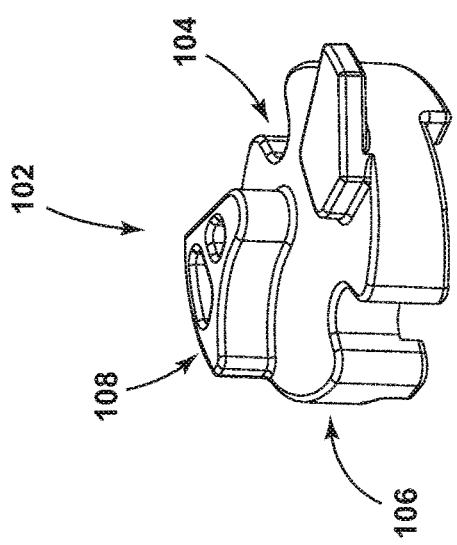
FIG. 2B
FIG. 2A

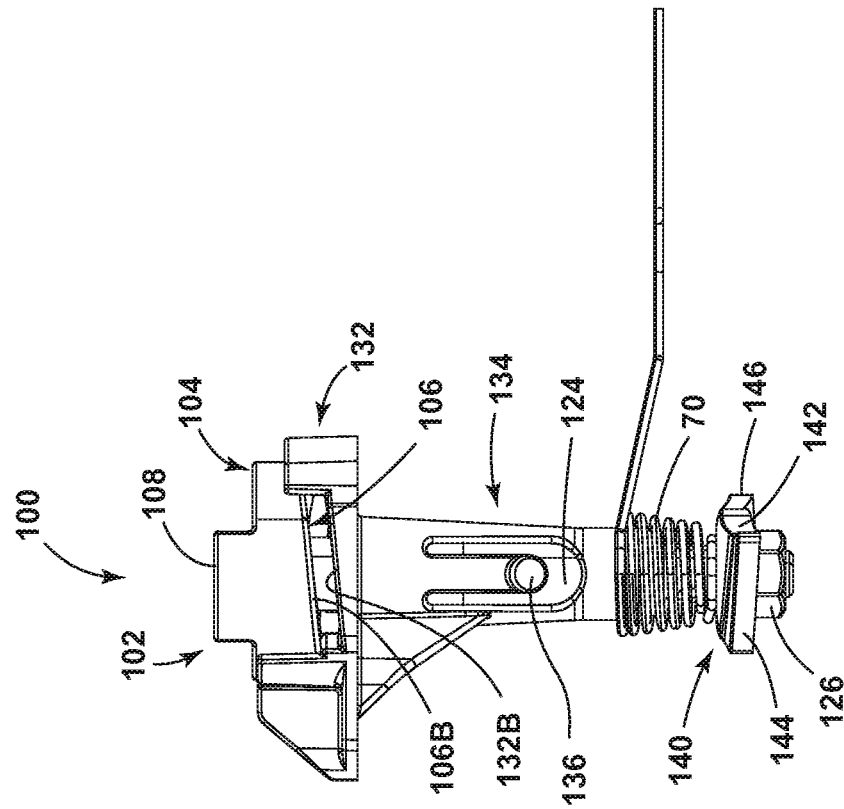
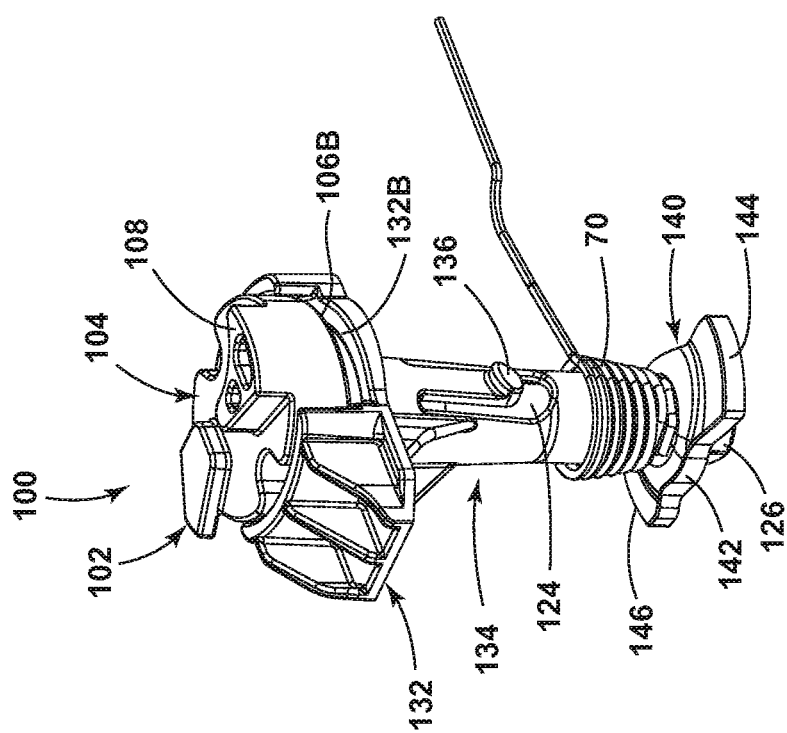
FIG. 3C
FIG. 3B

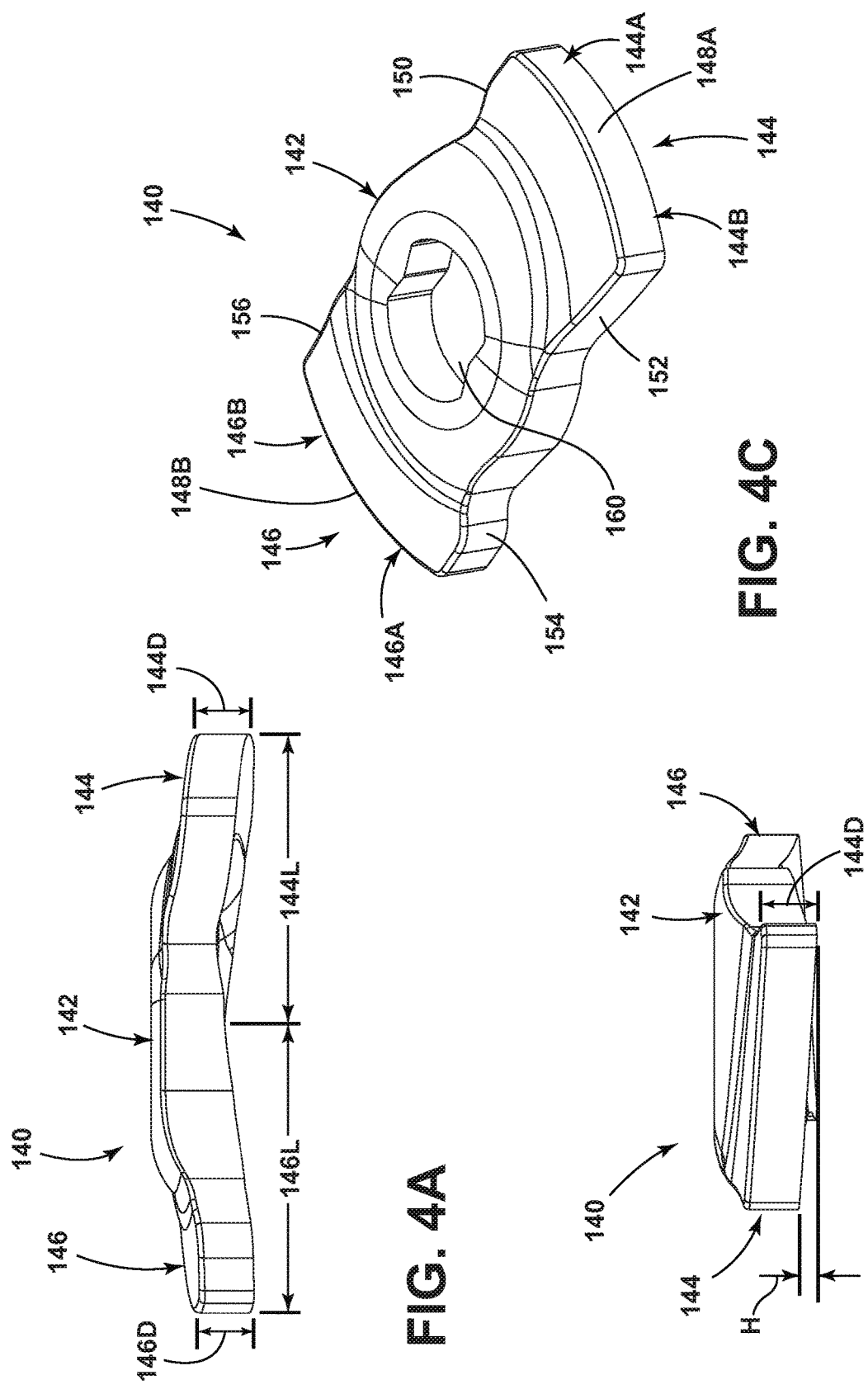

SUPPORT ASSEMBLY WITH CAM ASSEMBLY

CROSS-REFERENCE TO RELATED APPLICATION

This application claims the benefit of French Patent Application Serial No. 1853891, filed on May 4, 2018; French Patent Application Serial No. 1853892, filed on May 4, 2018; French Patent Application Serial No. 1853893, filed on May 4, 2018; and French Patent Application Serial No. 1853894, filed on May 4, 2018; the disclosures of which are hereby incorporated herein by reference in their entireties.

TECHNICAL FIELD

The present disclosure generally relates to support assemblies, including support assemblies with cam assemblies that may be used in connection with tracks, such as vehicle seat tracks.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

With some designs, excess play may be present between components, which may cause unwanted noise and/or rattling. Some designs may not be configured to compensate for a great enough amount of play.

There is a desire for solutions/options that minimize or eliminate one or more challenges or shortcomings of support assemblies and cam assemblies. The foregoing discussion is intended only to illustrate examples of the present field and should not be taken as a disavowal of scope.

SUMMARY

In embodiments, a cam assembly may include a pin, a first cam, a second cam, and/or a bearing. The first cam may be connected to the pin, and/or the second cam may be connected to the pin. A bearing may be configured to rotatable support the pin. The second cam may include a first portion and/or a second portion. The first portion of the second cam may be configured to contact a track in a first vertical position of the pin. The second portion of the second cam may be configured to contact said track in a second vertical position of the pin. The first portion may be vertically offset from the second portion. The first position of the pin may correspond to an unloaded state. The second vertical position of the pin may correspond to a loaded state. The second cam may be in a first rotational position when the pin may be in the first vertical position. The second cam may be in a second rotational position when the pin may be in a second vertical position. The first cam may be circumferentially tapered. The second cam may be radially tapered. The second cam may be circumferentially tapered. The first cam, the pin, and/or the second cam may be configured to move vertically relative to the bearing. The cam assembly may include a biasing member that may be configured to vertically and/or rotationally bias the second cam. The biasing member may be configured to provide torsional forces to the second cam to compensate for vertical loads and/or may cause the second cam to remain in contact with said track.

The second cam may be disposed above a bottom end of the pin. The second cam may be stamped from sheet metal.

In embodiments, a support assembly may include the cam assembly, a support member, and/or said track. The support member may be configured for selectively connecting with said track and/or for selectively moving along said track. The support member may include an aperture. The bearing may include a protrusion, and/or engagement of the protrusion with the aperture may limit vertical movement of the bearing.

In embodiments, a cam for a track adjuster may include a body. The body may include a first wing that may extend from the body, and/or a second wing that may extend from the body. The first wing and/or the second wing may be circumferentially tapered and/or radially tapered. A length of the body may be greater than a width of the body. The length of the body may include radial lengths of the first wing and/or the second wing. The first wing may include a tapered bottom surface. The first wing may include a thickness and/or a radial length. The radial length may be greater than the thickness. A bottom edge of the first wing may be lower than a bottom edge of the body. A first circumferential edge of the first wing may be parallel to a second circumferential edge of the second wing.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 2A is a perspective view generally illustrating an embodiment of a first cam according to teachings of the present disclosure.

FIG. 2B is a perspective view generally illustrating embodiments of a first cam and a pin according to teachings of the present disclosure.

FIGS. 3A, 3B, and 3C are perspective views generally illustrating embodiments of cam assemblies according to teachings of the present disclosure.

FIGS. 4A and 4B are side views generally illustrating embodiments of a second cam according to teachings of the present disclosure.

FIG. 4C is a perspective view generally illustrating an embodiment of a second cam according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1A:
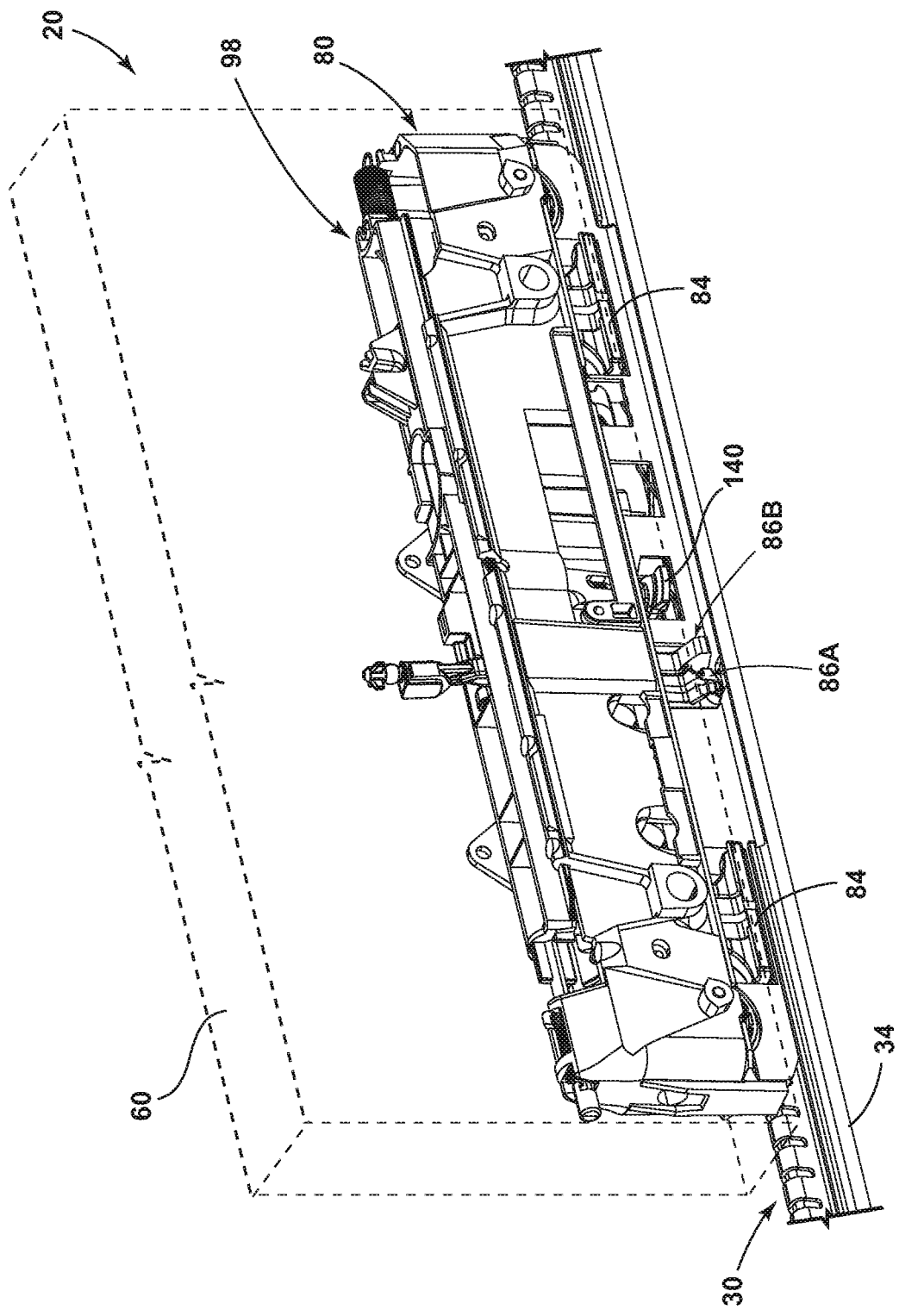
FIGS. 1A and 1B are perspective views generally illustrating portions of embodiments of support assemblies according to teachings of the present disclosure.
Figure 1B:
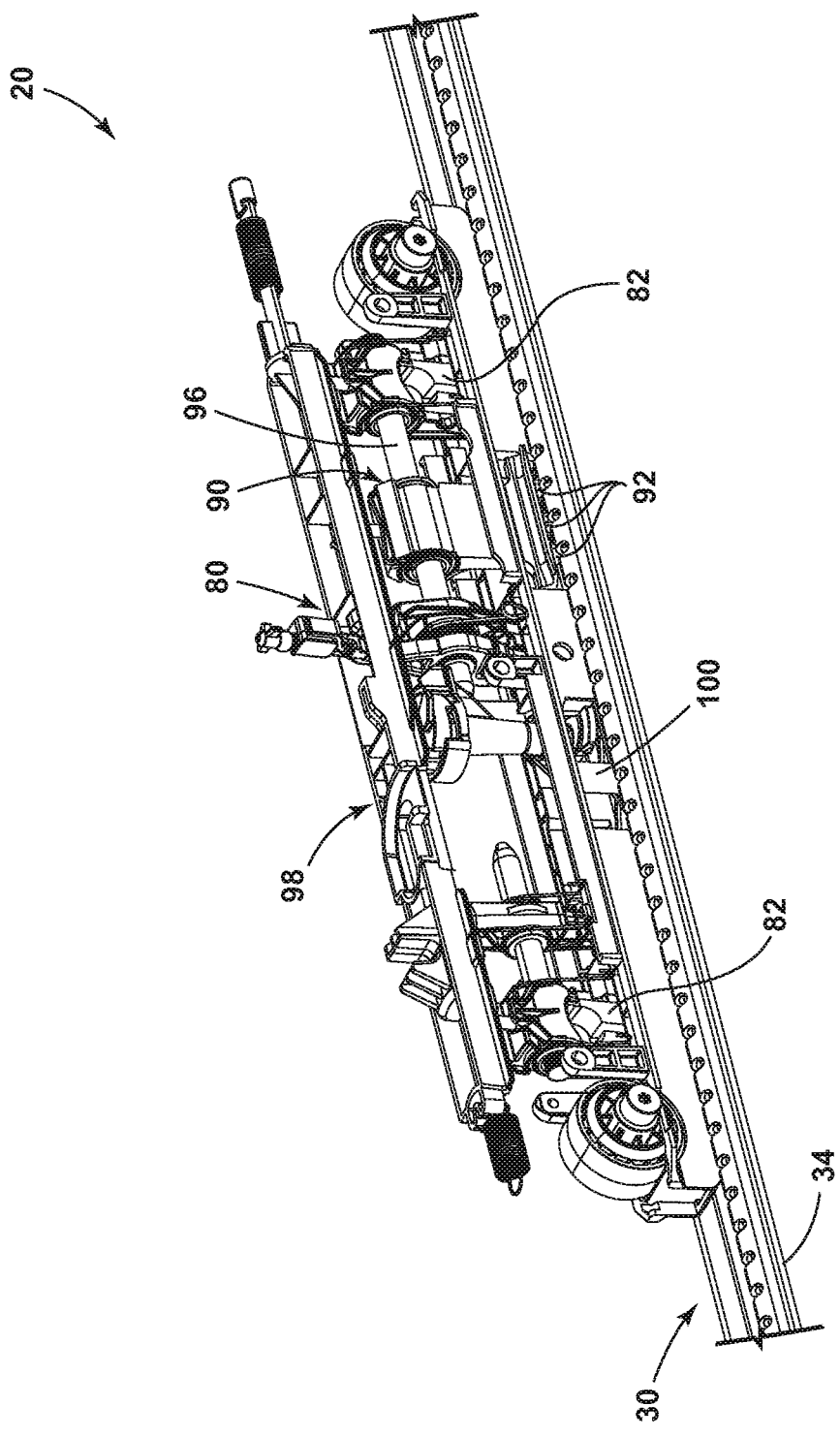

In embodiments, such as generally illustrated in FIGS. 1A and 1B, a support assembly 20 may include a support member 80 and/or a track 30. The support member 80 may be configured to support an external component 60 on a track 30. For example and without limitation, an external component may include a vehicle seat assembly and the support member 80 may be configured to support the vehicle seat assembly on a seat track 30. The support assembly 20 may facilitate movement of the external component 60 along a track 30.

Figure 1C:
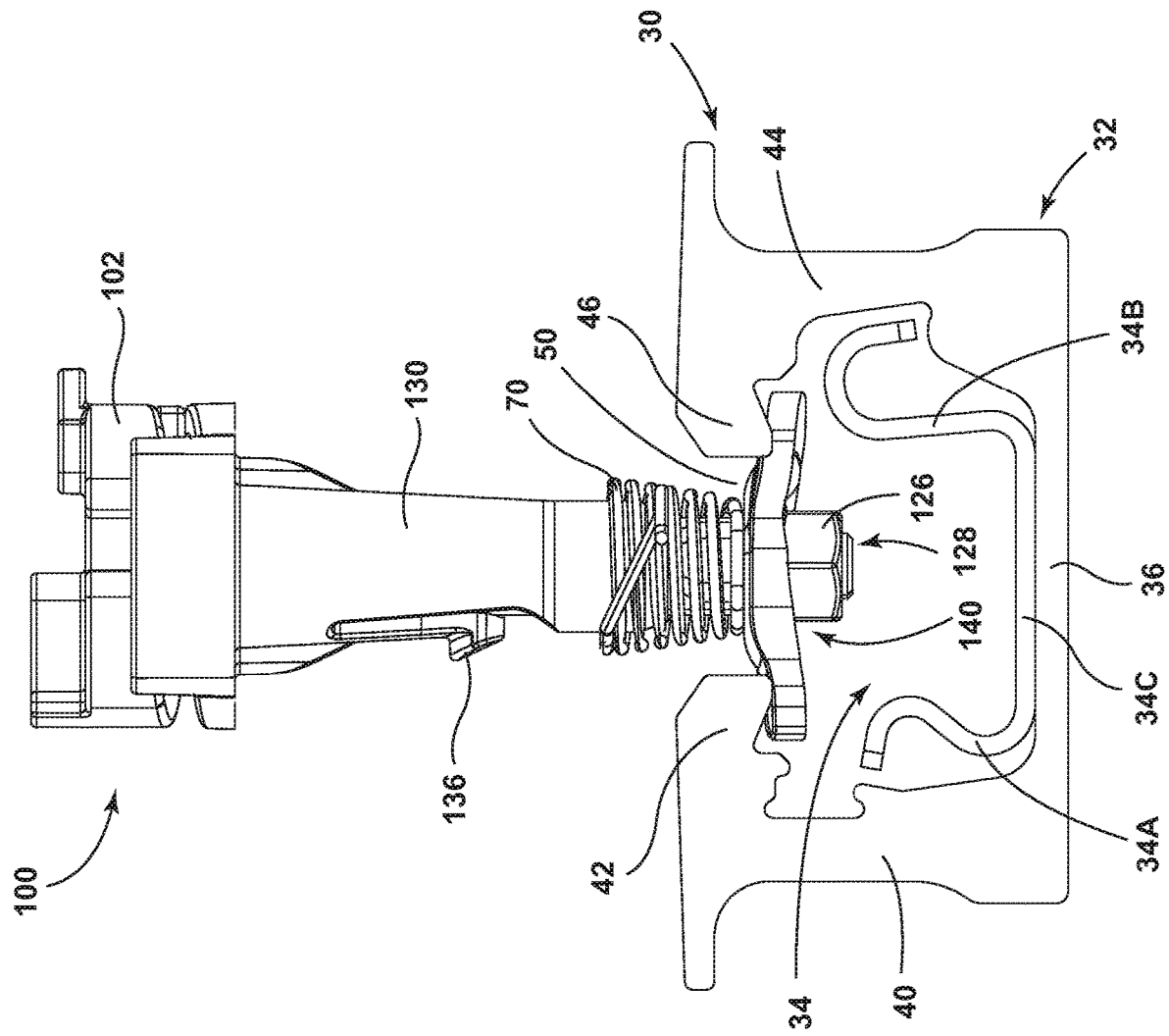
FIG. 1C is a cross-sectional view generally illustrating portions embodiments of a cam assembly and a track according to teachings of the present disclosure.

In embodiments, such as generally illustrated in FIGS. 1A, 1B, and 1C, a support assembly 20 may include a track 30 may be included in the support assembly 20. The track 30 may extend in a longitudinal direction. The track 30 may include a first portion 32 and a second portion 34 (see, e.g., FIG. 1C). The second portion 34 of the track 30 may be disposed within the first portion 32 of the track 30. The first portion 32 of the track 30 may include a bottom wall 36, a first side wall 40, and/or a second side wall 44. The bottom wall 36, the first side wall 40, and/or the second side wall 44 may be connected to form a generally U-shaped configuration. The bottom wall 36 may, for example, be substantially planar and/or horizontal. The first side wall 40 and/or the second side wall 44 may extend vertically from the bottom wall 36. The first side wall 40 may include a first contact portion 42, and/or the second side wall 44 may include a second contact portion 46. The first contact portion 42 and/or the second contact portion 46 may project laterally toward a center of the track. The first contact portion 42 and/or the second contact portion 46 may be substantially planar. In embodiments, a gap 50 may be included between the first contact portion 42 and the second contact portion 46. The gap 50 may extend longitudinally along the track 30, and/or the gap 50 may be centered along the track 30.

In embodiments, the second portion 34 of the track 30 may be generally U-shaped. A first side wall 34A and/or a second side wall 34B, may extend from a third side wall 34C (e.g., a base wall). The base wall 34C of the second portion 34 of the track 30 may be disposed on an inner surface of the bottom wall 36 of the first portion 32 of the track 30. A first side wall 34A and/or a second side wall 34B may be curved (e.g., may include a generally C-shaped profile). A side wall (e.g., the first side wall 34A) may, for example, include a C-shaped profile that may open outward. A side wall (e.g., the second side wall 34B) may, for example, include a C-shaped profile that may open downward.

With embodiments, a support member 80 may be connected to (e.g., engage) a track 30. The support member 80 and/or the track 30 may extend substantially longitudinally. For example and without limitation, the support member 80 may move (e.g., slide and/or roll) in a longitudinal direction along the track 30. The support member 80 may selectively engage and/or disengage from the track 30.

In embodiments, such as generally illustrated in FIGS. 1A and 1B, the support member 80 may include a cassette configuration, and/or may include anchoring components 82, a first lever 86A, a second lever 86B, and/or a locking component 90 (e.g., which may be configured to selectively connect the support member 80 with the track 30). The anchoring components 82, levers 86A, 86B, and/or locking components 90 may be disposed substantially within the support member 80 (see, e.g., FIG. 1A). The locking component 90 may include one or more track locking portion 92 that may be moved into and out of engagement with a second portion 34 of the track 30 to selectively restrict longitudinal movement of the support member 80. The anchoring components 82 may include engagement portions 84 to selectively connect the support member 80 to a first portion 32 of the track 30 and/or to prevent vertical removal of the support member 80 from the track 30 (e.g., the engagement portions 84 may only be in contact with the track 30 during a crash-load). The levers 86A, 86B may be configured to rotate into and out of contact with the first portion 32 and/or the second portion 34 of the track 30. The levers 86A, 86B may rotate about an axis that may extend in a longitudinal direction. The levers 86A, 86B may be configured to selectively restrict or prevent longitudinal movement of the support member 80 in one or more directions (e.g., forward and/or rearward). The support member 80 may, for example and without limitation, be substantially rectangular shaped. An anchoring component 82, the levers 86A, 86B, and/or the locking component 90 may rotate about the same longitudinal axis (e.g., may be rotatably connected about a rod 96, such as generally illustrated in FIG. 1B). The support member 80 may include an actuator 98 that may be configured to actuate some or all of the anchoring components 82, the levers 86A, 86B, and/or the locking component 90. The actuator 98 may be configured as a slider 98 that may be configured to move longitudinally along the support member 80, such as to engage/actuate the anchoring components 82, the levers 86A, 86B, and/or the locking component 90.

In embodiments, a cam assembly 100 may be connected to the support member 80 and/or the slider 98. The cam assembly 100 may selectively connect the support member 80 to the track 30. The cam assembly 100 may limit and/or prevent the support member 80 from vertical disengagement from the track 30. The cam assembly 100 may be configured to limit and/or eliminate vertical play between the track 30 and the support member 80.

In embodiments, such as generally illustrated in FIGS. 1C, 2A, 2B, 3B, and 3C, the cam assembly 100 may include a first cam 102. The first cam 102 may be one or more of a variety of shapes, sizes, and/or configurations. For example and without limitation, the first cam 102 may be generally cylindrical and/or rounded (see, e.g., FIG. 2A). The first cam 102 may include a first side 104 (e.g., a top side) and a second side 106 (e.g., a bottom side). The first side 104 may include an engagement portion 108. The engagement portion 108 may be configured to engage the slider 98. The first cam 102 may rotate (e.g., about a vertical axis) as the slider 98 contacts the engagement portion 108. The second side 106 may be circumferentially tapered. For example and without limitation, the second side 106 may be circumferentially tapered about a perimeter of the second side 106 such that a vertical height of the first cam 102 may vary in a circumferential direction. The second side 106 may include a recess 110. The recess 110 may be configured to receive a pin 120. The second side 106 may include a first contact portion 106A, a second contact portion 106B, and/or a third contact portion 106C, which may each be circumferentially tapered (see, e.g., FIG. 2B). The first cam 102 may include one or more of a variety of materials. For example, the first cam 102 may include plastic and/or polymers.

In embodiments, such as generally illustrated in FIGS. 2B, 3B, and 3C, the cam assembly 100 may include a pin 120. The pin 120 may include a first portion 122 and a second portion 124. The first portion 122 (e.g., a head portion) may be substantially planar. The second portion 124 may extend vertically from the first portion 122. The second portion 124 may be generally cylindrical and/or rod-shaped. The pin 120 may connect with the first cam 102 (e.g., the first portion 122 of the pin 120 may connected to the first cam 102 via the recess 110 of the second side 106 of the first cam 102). The pin 120 and the first cam 102 may be connected such that both the pin 120 and the first cam 102 rotate upon rotation of either the pin 120 and/or the first cam 102. In embodiments, longitudinal movement of the slider 98 may rotate the first cam 102 which may rotate the pin 120 in the same direction. The pin 120 may include one or more of a variety of materials. For example and without limitation, the pin 120 may include metal.

Figure 3A:
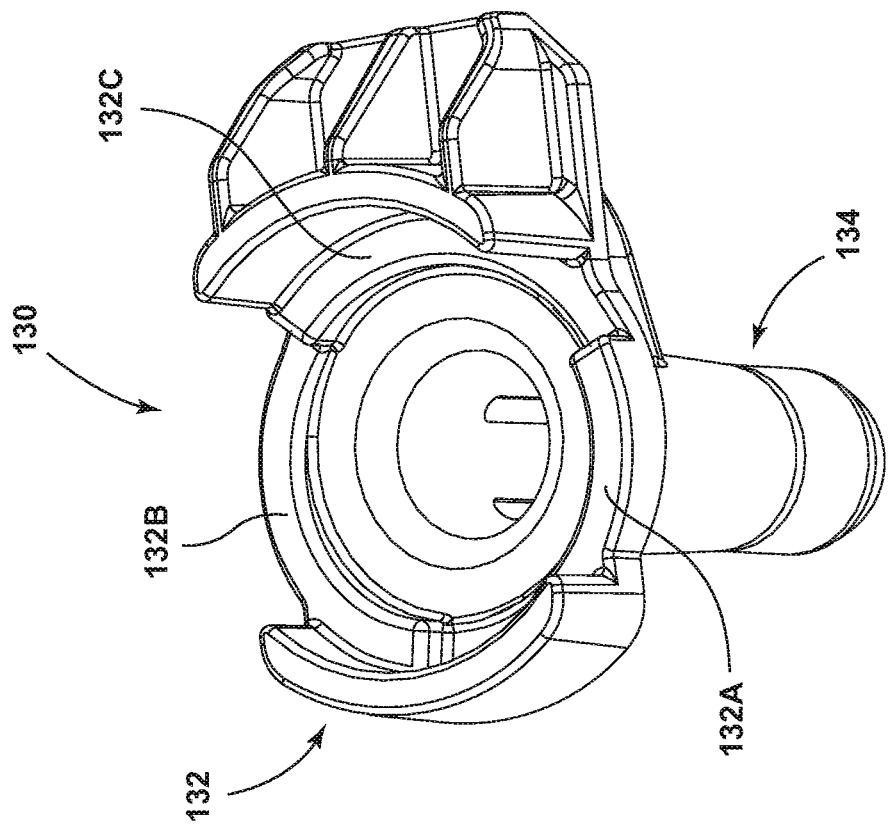
Figure 3D:
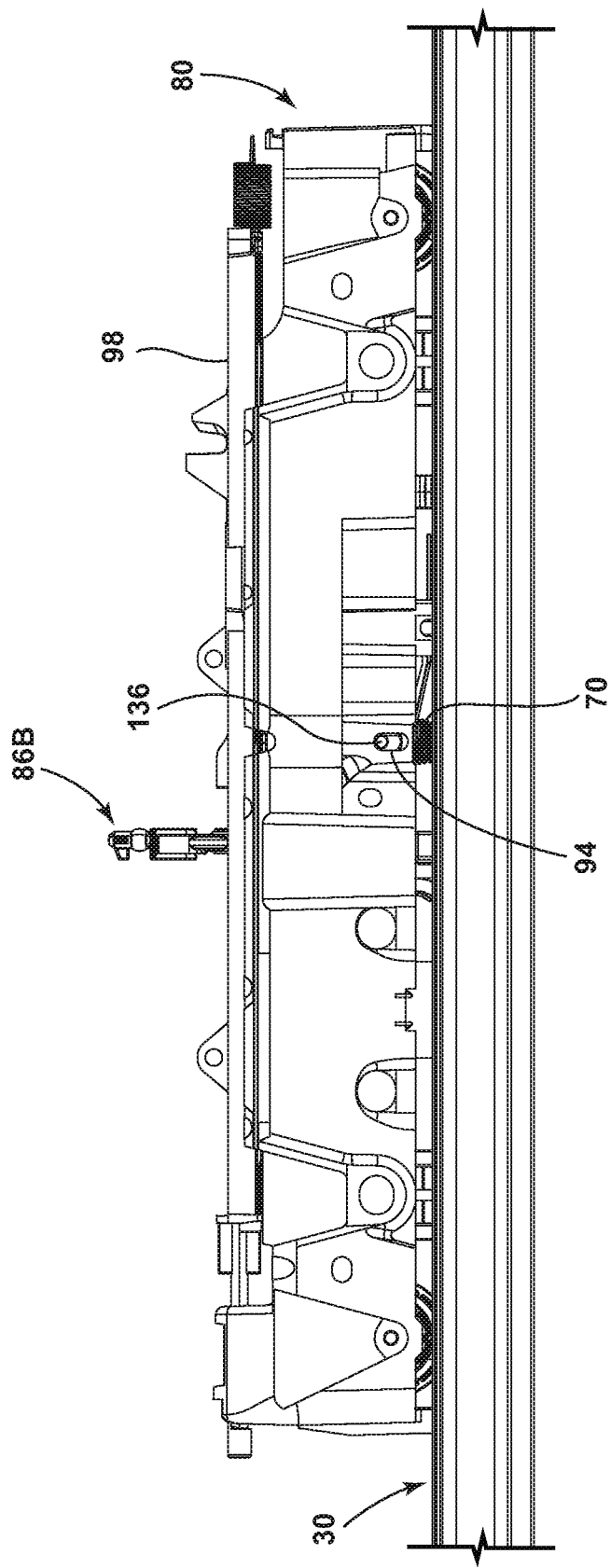
FIG. 3D is a side view generally illustrating an embodiment of a support assembly according to teachings of the present disclosure.

With embodiments, such as generally illustrated in FIGS. 3A, 3B, and 3B, a cam assembly 100 may include a sleeve 130 (e.g., a bearing). The sleeve 130 may be connected to the pin 120 and/or the first cam 102. The sleeve 130 may include a first portion 132 and a second portion 134. The first portion 132 of the sleeve 130 may be one or more of a variety of shapes, sizes, configurations, and/or materials. For example and without limitation, the first portion 132 may be substantially circular and/or rounded. The first portion 132 may be wider than the first cam 102 (e.g., may include a larger diameter). The sleeve 130 may be comprised of generally plastic materials. The first portion 132 may be connected to the second side 106 and/or an outer surface of the first cam 102. The first portion 132 may be configured to receive at least a portion of the first cam 102. The first portion 132 of the sleeve 130 may include a first contact portion 132A, a second contact portion 132B, and/or a third contact portion 132C which may be circumferentially tapered. The first contact portion 132A, the second contact portion 132B, and/or the third contact portion 132C of the sleeve 130 may contact the first contact portion 106A, the second contact portion 106B, and/or the third contact portion 106C, respectively, of the first cam 102. If the first cam 102 rotates, such as upon actuation via the actuator 98, the contact portions 122A, 122B, 122C may slide along contact portions 132A, 132B, 132C, which may cause the first cam 102 may move vertically (upward or downward) relative to the sleeve 130, which may cause the pin 120 and/or a second cam 140 to move vertically in a similar manner.

In embodiments, the second portion 134 of the sleeve 130 may be substantially cylindrical and/or the may be generally the same shape as the second portion 124 of the pin 120. The second portion 134 of the sleeve 130 may be configured to receive the second portion 124 of the pin 120. The sleeve 130 may not extend the entire length of the second portion 124 of the pin 120. With embodiments, a bottom 128 of the pin 120 may not be in contact with the sleeve 130.

In embodiments, the sleeve 130 may include a protrusion 136 (see, e.g., FIGS. 3A, 3B, and 3C). The protrusion 136 may be one or more of a variety of shapes, sizes, and/or configurations. For example and without limitation, the protrusion 136 may be substantially rounded and/or cylindrical. The protrusion 136 may extend in a radial direction (e.g., perpendicular) from the second portion 134 of the sleeve 130. The protrusion 136 may be configured to be received by an aperture 94 (see, e.g., FIG. 3C) in the support member 80. Engagement of the protrusion 136 with the aperture 94 may limit and/or prevent rotation of the sleeve 130. In embodiments, the protrusion 136 may move vertically within the aperture 94, such as during connection of the cam assembly 100 with the support member 80. The sleeve 130 may remain substantially fixed relative to the support member 80 while the pin 120 and/or the first cam 102 may rotate within the sleeve 130.

With embodiments, such as generally illustrated in FIGS. 3A, 3B, 4A, 4B, and 4C, a cam assembly 100 may include a second cam 140. The second cam 140 may include a body 142, a first wing 144, and/or a second wing 146. The first wing 144 and the second wing 146 may extend generally outward from the body 142. The first wing 144 and the second wing 146 may extend from opposite sides of the body 142. An outer edge 148A (e.g., a radial edge) of the first wing 144 may be substantially parallel to an outer edge 148B (e.g., a radial edge) of the second wing 146. The first wing 144 and/or the second wing 146 may be circumferentially tapered (e.g., a height of a wing 144, 146, in the axial direction, may vary in a circumferential direction) and/or may be radially tapered (e.g., a height of a wing 144, 146, in the axial direction, may vary in a radial direction). An outer radius of a wing 144, 146 may be substantially constant. In embodiments, a bottom of the first wing 144 and/or the second wing 146 may be lower than a bottom of the body 142 (see, e.g., FIG. 4A). A bottom surface of the first wing 144 and/or the second wing 146 may be tapered. The second cam 140 may be a monolithic component (e.g., stamped from sheet metal) and/or formed in various other ways.

In embodiments, the first wing 144 may include a first portion 144A and a second portion 144B. The second wing 146 may include a first portion 146A and a second portion 146B. The first portion 144A of the first wing 144 may be disposed proximate a first side 150 of the first wing 144, and/or the second portion 144B of the first wing 144 may be disposed proximate a second side 152 of the first wing 144. The second side 152 of the first wing 144 may be disposed at a greater height than the first side 150. The first portion 146A of the second wing 146 may be disposed proximate a first side 154 of the second wing 146, and/or the second portion 146B of the second wing 146 may be disposed proximate a second side 156 of the second wing 146. The second side 156 of the second wing 146 may be disposed at a greater height than the first side 154. The first side 150 of the first wing 144 may be disposed at substantially the same height as the first side 154 of the second wing 146. The second side 152 of the first wing 144 may be disposed at substantially the same height as the second side 156 of the second wing 146.

With embodiments, the first wing 144 and the second wing 146 may include thicknesses 144D, 146D and radial lengths 144L, 146L. The thickness 144D of the first wing 144 and/or the thickness 146D of the second wing 146 may be the substantially constant, such as in a circumferential direction. The radial lengths 144L, 146L may be greater than the thicknesses 144D, 146D.

In embodiments, the body 142 of the second cam 140 may include an aperture 160 for connection with the pin 120. The aperture 160 may provide rotational play between the pin 120 and the second cam 140. The second cam 140 may be connected at or about a bottom 128 of the second portion 124 of the pin 120. The body 142 of the second cam 140 may not be disposed at an end of the pin 120 (e.g., there may be a gap between a bottom of the body 142 and a bottom 128 of the pin 120). A biasing member 70 may be connected to the second cam 140, the second portion 134 of the sleeve 130, and/or the support member 80. The biasing member 70 may bias the second cam 140 away from the sleeve 130 (e.g., vertically downward) and/or into engagement with the track 30. The second cam 140 may be connected to the second portion 124 of the pin 120 via a fastener 126 (e.g., a nut and/or bolt).

With embodiments, the second cam 140 may be configured to selectively contact the track 30. The first wing 144 may contact the first contact portion 42 of the first side wall 40 and/or the second wing 146 may contact the second contact portion 46 of the second side wall 44. For example and without limitation, a top surface of the first wing 144 and a top surface of the second wing 146 may contact/engage an inner surface of the first contact portion 42 and an inner surface of the second contact portion 46, respectively.

In embodiments, a cam assembly 100 may include varying vertical positions relative to the track 30, such as due to varying loads on the support member 80. Additionally and alternatively, the position of the cam assembly 100 may vary due to component manufacturing variances. Such loads and/or manufacturing variances may result in various relative positions of the cam assembly 100 relative to the track 30. The pin 120 and the second cam 140 may be configured to compensate for such different vertical positions. The second cam 140 may rotate to contact the track 30 and maintain contact with the track for multiple positions of the pin 120. Maintaining contact between the second cam 140 and the track 30 may limit or reduce play between the track 30 and the support member 80, which may limit noise (e.g., rattling) during operation and/or use of the support member 80.

In embodiments, such as generally illustrated in FIGS. 5A, 5B, 5C, 6A, 6B, and 6C, the second cam 140 may include a first position, a second position, and/or a third position. When the second cam 140 is in the first position, the second cam 140 may be inserted into and/or removed from the gap 50 without contacting the track 30 (e.g., when in the first position, the second cam 140 may not be able to contact the track 30). In the first position, the second cam 140 may be generally parallel to the track 30 in a longitudinal direction, and the second cam 140 may be vertically aligned with the gap 50 (see, FIGS. 5A and 6B). In the first position, the second cam 140 may be parallel to or at a first angle $\theta_1$ (e.g., an acute angle) with respect to the longitudinal direction, and the first wing 144 and the second wing 146 may not contact the track 30.

Figure 5C:
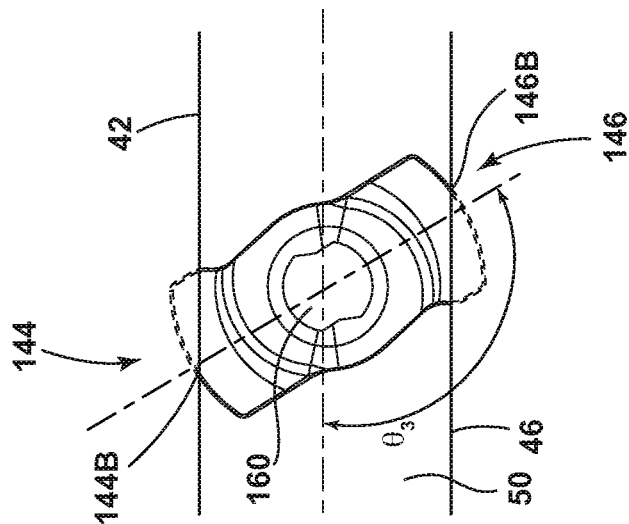
FIGS. 5A, 5B, and 5C are top views generally illustrating embodiments of second cams and tracks according to teachings of the present disclosure.
Figure 5B:
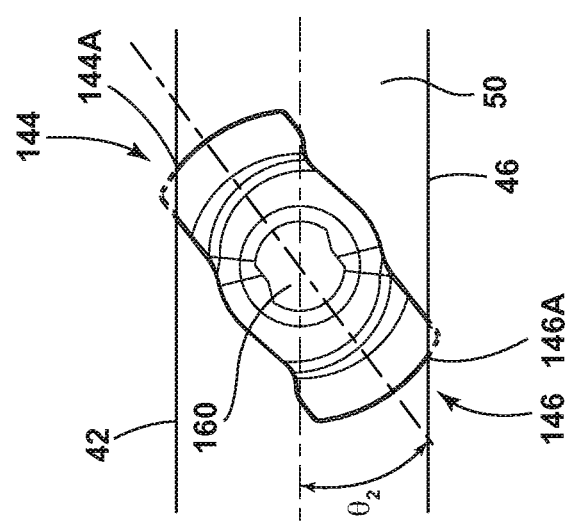
Figure 5A:
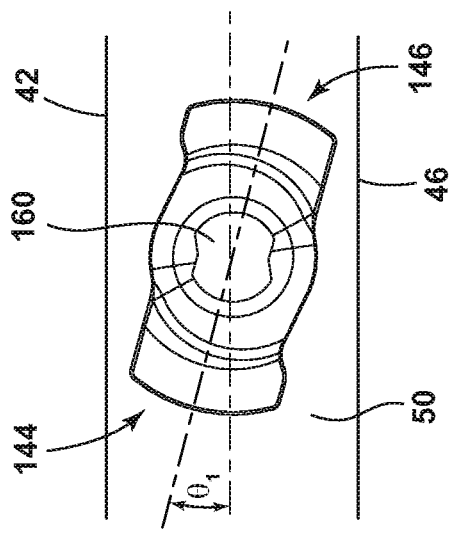
Figure 6A:
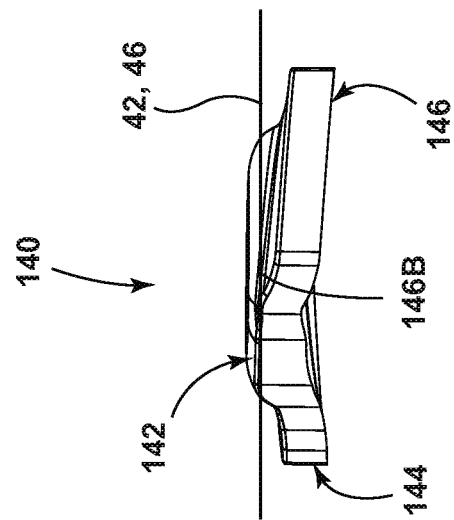
FIGS. 6A, 6B, and 6C are side views generally illustrating embodiments of second cams and tracks according to teachings of the present disclosure.
Figure 6B:
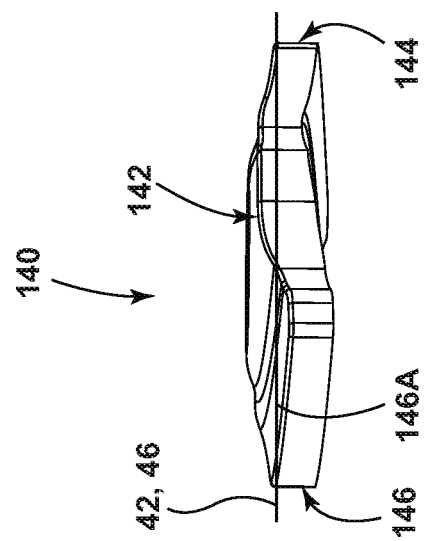
Figure 6C:
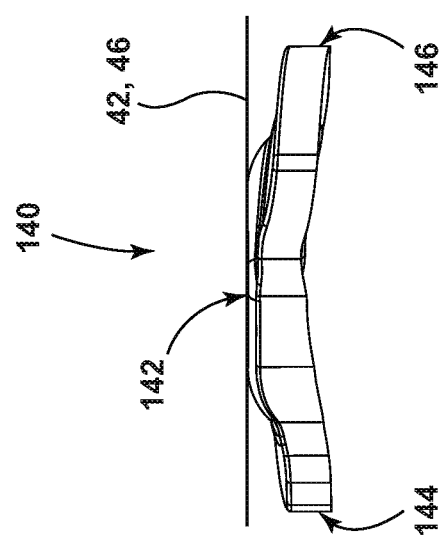

With embodiments, if the second cam 140 is in the second position, the first wing 144 and/or the second wing 146 may contact the first contact portion 42 and/or the second contact portion 46 of the track 30 (see, FIGS. 5B and 6B). The second cam 140 may contact the track 30 such that movement of the support member 80 in a vertical direction is limited and/or prevented relative to the track 30. The first wing 144 may contact the first contact portion 42 of the track 30 at the first portion 144A of the first wing 144. The second wing 146 may contact the second contact portion 46 of the track 30 at the first portion 146A of the second wing 146. The second portion 144B of the first wing 144 and/or the second portion 146B of the second wing 146 may not be in contact with the contact portions 42, 46 of the track 30. In the second position, the second cam 140 may be disposed at a second angle $\theta_2$ relative to the longitudinal direction. The second angle $\theta_2$ may be greater than the first angle $\theta_1$.

In embodiments, if the second cam 140 is in the third position, the first wing 144 and/or second wing 146 may contact the first contact portion 42 and/or the second contact portion 46 of the track 30 (see, FIGS. 5C and 5D). In the third position, the first wing 144 may contact the first contact portion 42 of the track 30 at the second portion 144B of the first wing 144, and/or the second wing 146 may contact the second contact portion 46 of the track 30 at the second portion 146B of the second wing 146. The first portion 144A of the first wing 144 and/or the first portion 146A of the second wing 146 may not be in contact with the contact portions 42, 46 of the track 30. The second cam 140 may contact the track 30 such that movement of the support member 80 in a vertical direction is limited and/or prevented relative to the track 30. In the third position, the second cam 140 may be disposed at a third angle $\theta_3$ relative to the longitudinal direction. The third angle $\theta_3$ may be greater than the second angle $\theta_2$.

In embodiments, the pin 120 may be in a first position (e.g., a design or unloaded position) and a second position (e.g., a loaded position). If the pin 120 is in a first position, the second cam 140 may rotate between the first position, in which the second cam 140 does not engage the track 30, and the second position in which the second cam 140 engages the track 30 at or about the first portion 144A and the first portion 146A.

With embodiments, if the pin 120 is in the second position, such as if the pin 120 has been vertically displaced downward from a design position, the second cam 140 may not contact the track 30 while the second cam 140 is in the second position. If the pin 120 is in the second position, the biasing member 70 may cause the second cam 140 to rotate past the second position to the third position. In the third position of the second cam 140, the second portions 144B, 146B of the wings 144, 146, which may be disposed higher than the first portions 144A, 146A, may contact the contact portions 42, 46 of the first portion 32 of the track. A height difference between the first portions 144A, 146A, and the second portions 144B, 146B may compensate for a vertical difference between the first position of the pin 120 and a second position of the pin 120. If the wings 144, 146 were planar, the second cam 140 may not contact the track 30 in the second position of the pin 120.

In embodiments, a height difference H of the first side 150 of the first wing 144 and/or the second side 152 of the first wing 144 may correspond to a maximum vertical distance between the first and second positions of the pin 120 that the second cam 140 can compensate for (see, e.g., FIG. 4B). When rotating the second cam 140, the biasing member 70 may exert a vertical force and a rotational (e.g., torsional) force between the second cam 140 and the track 30. The vertical force and the rotational force caused by the biasing member 70 may facilitate maintaining contact between the second cam 140 and the track 30 to eliminate noise and/or rattling.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A cam assembly, comprising:
   a pin;
   a first cam connected to the pin;
   a second cam connected to the pin; and
   a bearing configured to rotatably support the pin;
   wherein the second cam includes a first portion and a second portion;
   the first portion of the second cam is configured to contact a track in a first vertical position of the pin;
   the second portion of the second cam is configured to contact said track in a second vertical position of the pin; and
   the first portion is vertically offset from the second portion.

2. The cam assembly of claim 1, wherein the first vertical position of the pin corresponds to an unloaded state.

3. The cam assembly of claim 2, wherein the second vertical position of the pin corresponds to a loaded state.

4. The cam assembly of claim 1, wherein the second cam is in a first rotational position when the pin is in the first vertical position, and the second cam is in a second rotational position when the pin is in a second vertical position.

5. The cam assembly of claim 1, wherein the first cam is circumferentially tapered.

6. The cam assembly of claim 5, wherein the second cam is radially tapered.

7. The cam assembly of claim 6, wherein the second cam is circumferentially tapered.

8. The cam assembly of claim 1, wherein the first cam, the pin, and the second cam are configured to move vertically relative to the bearing.

9. The cam assembly of claim 1, wherein the cam assembly includes a biasing member configured to vertically and rotationally bias the second cam.

10. The cam assembly of claim 9, wherein the biasing member is configured to provide torsional forces to the second cam to compensate for vertical loads and cause the second cam to remain in contact with said track.

11. The cam assembly of claim 1, wherein the second cam is disposed above a bottom end of the pin.

12. The cam assembly of claim 11, wherein the second cam is stamped from sheet metal.

13. A support assembly, the support assembly comprising:
   a support member including the cam assembly of claim 1; and
   said track;
   wherein the support member is configured for selectively connecting with said track and for selectively moving along said track.

14. The support assembly of claim 13, wherein the support member includes an aperture; the bearing includes protrusion; and engagement of the protrusion with the aperture limits vertical movement of the bearing.

15. A cam for a track adjuster, the cam comprising:
   a body, the body including
      a first wing extending from the body; and
      a second wing extending from the body;
   wherein the first wing and the second wing are circumferentially tapered and radially tapered.

16. The cam of claim 15, wherein a length of the body is greater than a width of the body; and the length of the body includes radial lengths of the first wing and the second wing.

17. The cam of claim 15, wherein the first wing includes a tapered bottom surface.

18. The cam of claim 15, wherein the first wing includes a thickness and a radial length, and the radial length is greater than the thickness.

19. The cam of claim 15, wherein a bottom edge of the first wing is lower than a bottom edge of the body.

20. The cam of claim 15, wherein a first circumferential edge of the first wing is parallel to a second circumferential edge of the second wing.

* * * * *